United States Patent
Ellis et al.

(10) Patent No.: US 6,651,795 B2
(45) Date of Patent: Nov. 25, 2003

(54) CLUTCH PRESSURE PLATE AND FLYWHEEL WITH FRICTION WEAR SURFACES

(75) Inventors: Lawrence Edward Ellis, Dearborn Heights, MI (US); Joseph Swithan Vanselous, Highland, MI (US); John E. Chancey, Grosse Pointe Farms, MI (US); Larry G Gargol, Ann Arbor, MI (US); Srikanth C. Reddy, Southfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 09/683,996

(22) Filed: Mar. 11, 2002

(65) Prior Publication Data
US 2003/0168303 A1 Sep. 11, 2003

(51) Int. Cl.⁷ .......................... F16D 69/00; F16D 13/60; B23K 10/00
(52) U.S. Cl. ................. 192/70.14; 192/107 M; 29/527.2; 219/121.47; 427/576
(58) Field of Search .......................... 192/70.14, 107 R, 192/107 M; 188/218 XL, 251 M; 74/572; 29/527.2, 527.3; 427/449, 576; 219/76.16, 121.47

(56) References Cited

U.S. PATENT DOCUMENTS

| | | | | |
|---|---|---|---|---|
| 2,719,438 A | * | 10/1955 | Schiefer | ........................ 74/572 |
| 3,584,718 A | * | 6/1971 | Schiefer et al. | ........... 192/70.14 |
| 4,049,090 A | * | 9/1977 | Buell | ..................... 188/251 M |
| 4,146,654 A | * | 3/1979 | Guyonnet | .................... 427/451 |
| 4,180,622 A | * | 12/1979 | Burkhard et al. | ........... 428/564 |
| 5,296,667 A | | 3/1994 | Marantz et al. | |
| 5,407,048 A | * | 4/1995 | Sievers | ..................... 192/70.14 |
| 5,808,270 A | | 9/1998 | Marantz et al. | |
| 5,884,388 A | | 3/1999 | Patrick et al. | |

OTHER PUBLICATIONS

Harrison, Keith et al., Thermally Sprayed Coatings for Lightweight Brake Rotors, Mar. 1, 1999, SAE 1999–01–0139.

* cited by examiner

Primary Examiner—Richard M. Lorence

(57) ABSTRACT

An aluminum pressure plate and flywheel, for a clutch in a vehicle drivetrain, have wear resistant surfaces applied at the clutch disc interface. The wear resistant surfaces are applied to the pressure plate and flywheel using a plasma transferred wire arc thermal spray process.

16 Claims, 3 Drawing Sheets

CLUTCH PRESSURE PLATE AND FLYWHEEL WITH FRICTION WEAR SURFACES

BACKGROUND OF THE INVENTION

The present invention relates to vehicle drivetrains and more particularly to clutches employed between an engine and transmission.

For conventional drive trains driven by an internal combustion engine and manual transmission, there is typically a cast iron flywheel and pressure plate mounted in the dry clutch assembly between the engine and transmission. In some instances, it is desirable to reduce the rotational inertia of the clutch assembly, which has been done by using a lighter material, such as aluminum for the flywheel. However, aluminum does not have the long term wear characteristics of cast iron and so this necessitates affixing a wear resistant surface to the flywheel where it contacts the clutch disc. This has been accomplished by riveting a steel plate to the face of the aluminum flywheel on the surface that contacts the clutch disc. But riveting a steel plate takes extra manufacturing steps and requires having extra parts to assemble. It is desirable to produce such a wear resistant surface in an accurate, reliable and cost effective manner without adding additional parts to be assembled.

A further requirement for a fly wheel is that, since this component operates in a dry clutch, it must have very good heat dissipation characteristics. Aluminum dissipates heat significantly better than iron and steel, and good heat dissipation is needed for superior performance in a dry clutch application.

Moreover, there is a desire to further reduce the rotational inertia of the clutch in order to improve vehicle performance. Thus, it is desirable to have clutch rotating components made out of aluminum, in order to reduce the rotational inertia of the clutch, and yet still have adequate wear resistance and heat dissipation where needed at friction interfaces.

SUMMARY OF THE INVENTION

In its embodiments, the present invention contemplates a clutch assembly for selectively coupling an engine crankshaft to a transmission input shaft. The clutch assembly includes a flywheel assembly rotationally couplable to the engine crankshaft, and a pressure plate assembly rotationally fixed to the flywheel assembly, with the pressure plate assembly including a friction member, being formed substantially of aluminum, and including a friction face, with the friction face having a friction surface, formed substantially of a ferrous metal, and with the friction surface applied to the friction member by a PTWA thermal spray process. The clutch assembly also includes a clutch disc mounted between the flywheel and the pressure plate, and rotationally couplable to the transmission input shaft.

The present invention further contemplates a method of applying a wear resistant coating to a rotating component of a vehicle clutch, the method comprising the steps of: providing the rotating component with a friction member, with the friction member being formed from aluminum and having a friction face thereon; and creating a friction surface on the friction face by applying a ferrous metal on the friction face with a PTWA thermal spray.

Accordingly, an object of the present invention is to apply a wear resistant coating to the friction surface of an aluminum pressure plate through the use of a plasma transferred wire arc (PTWA) thermal spray process.

A further object of the present invention is to apply a wear resistant coating to the friction surfaces of an aluminum flywheel through the use of a plasma transferred wire arc (PTWA) thermal spray process.

An advantage of the present invention is that an aluminum flywheel and pressure plate, coated on their wear surfaces by the PTWA process creates components that maintain a low inertia while also improving the heat dissipation characteristics. The rotating inertia of the clutch is reduced even further since the pressure plate, in addition to the flywheel, is made of aluminum.

Another advantage of the present invention is that the aluminum components, coated with a wear resistant material, are accurately and reliably produced, with minimal coating equipment down time.

DETAILED DESCRIPTION

Figure 1:
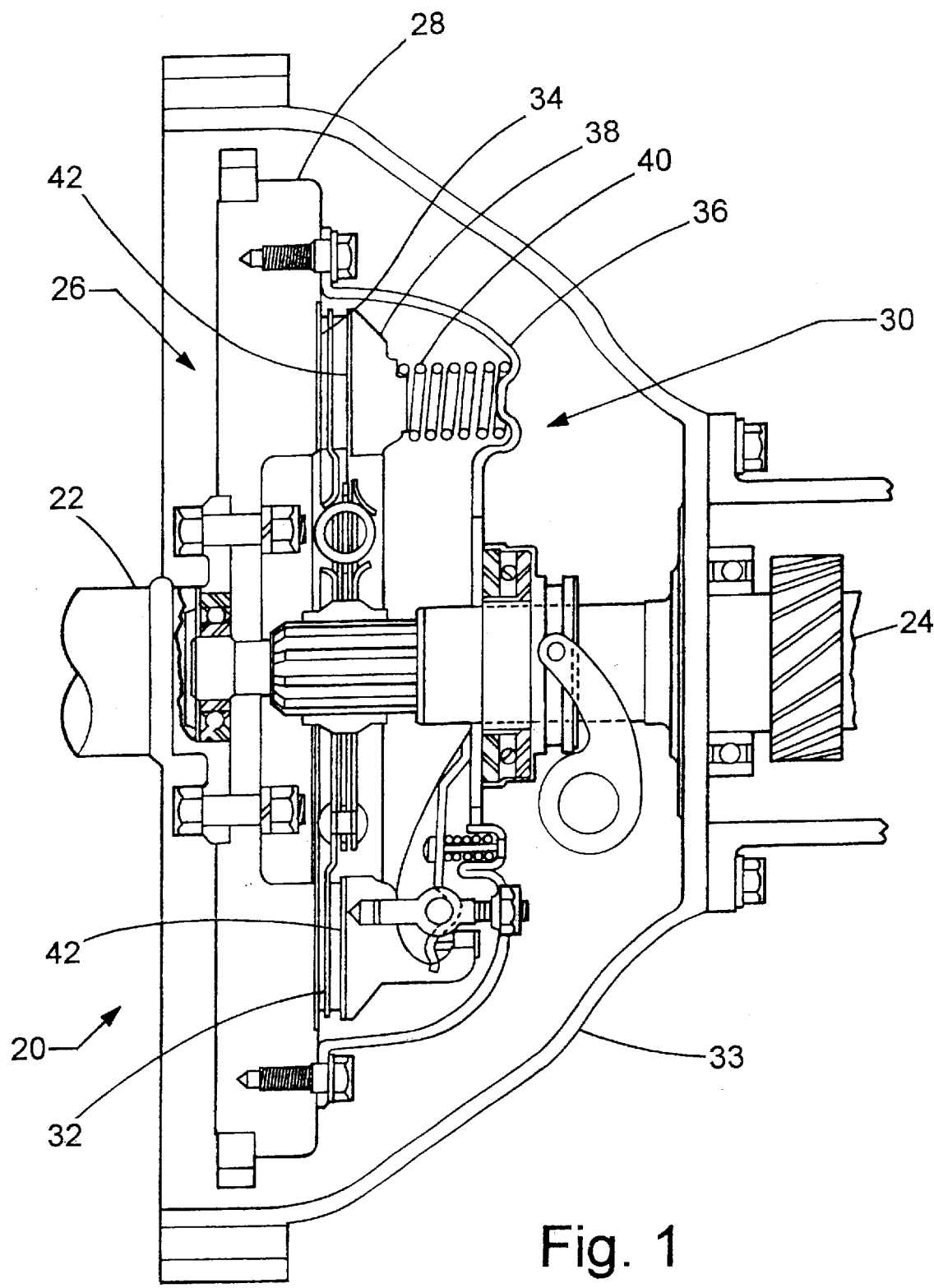
FIG. 1 is a schematic, sectional view of a vehicle clutch in accordance with the present invention.
Figure 3:
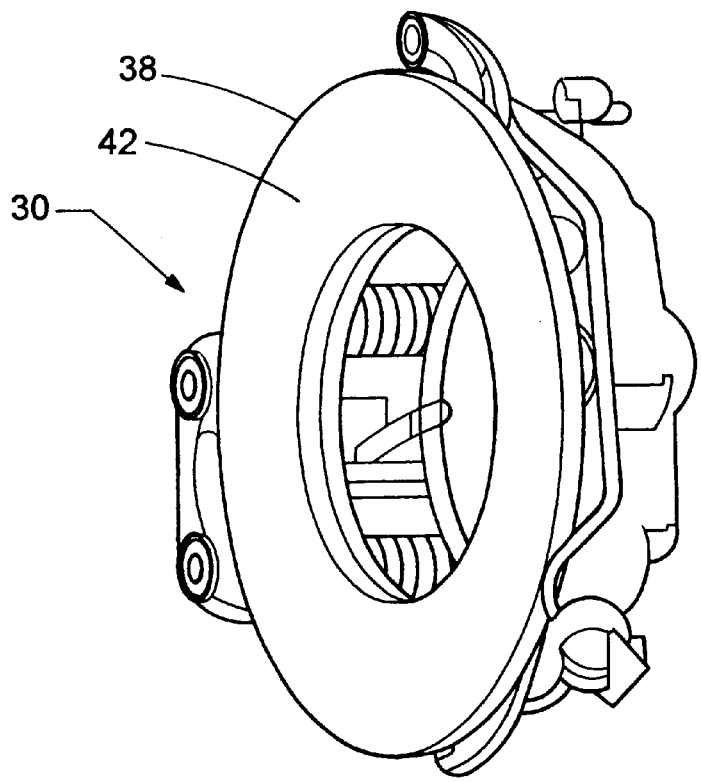
FIG. 3 is a perspective view of a pressure plate assembly in accordance with the present invention.
Figure 2:
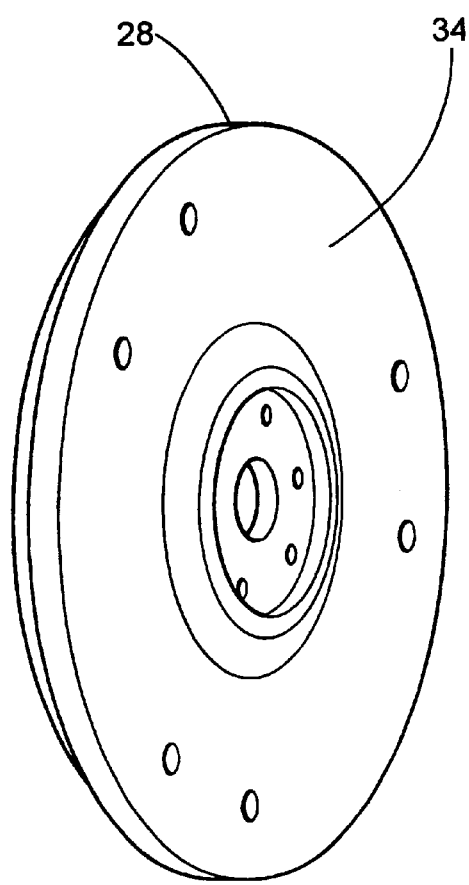
FIG. 2 is a perspective view of a portion of an engine flywheel in accordance with the present invention.

FIGS. 1–3 illustrate a clutch assembly 20, which is rotationally coupled to an engine crankshaft assembly 22, and to a transmission input shaft 24. The clutch assembly 20 includes a flywheel assembly 26, which is bolted to and driven by the crankshaft assembly 22, and a pressure plate assembly 30, which is bolted to and driven by the flywheel assembly 26. Mounted between the flywheel assembly 26 and the pressure plate assembly 30 is a clutch disc assembly 32. The clutch disc assembly 32 is splined to the transmission input shaft 24. The clutch assembly 20 also includes a clutch housing 33 that surrounds the other components and is mounted between the engine (not shown) and the transmission (not shown).

The flywheel assembly 26 includes a flywheel friction member 28. The flywheel friction member 28 is formed from aluminum in order to reduce its weight from that of cast iron or steel. It includes a friction surface 34, which is a very thin layer of steel added on top of the aluminum by the PTWA thermal spray process, as described below. This friction surface 34 is adjacent to and faces the clutch disc assembly 32. Preferably, this friction surface 34 is formed of a mild steel, a carbon steel, or a stainless steel, or a combination thereof. The thickness of the friction surface 34 is shown exaggerated in FIGS. 1 and 4 for clarity in describing the invention.

The pressure plate assembly 30 includes a cover 36, which is bolted to the flywheel assembly 26, and a pressure plate friction member 38, which is mounted adjacent to the clutch disc assembly 32. Springs 40 mount between the cover 36 and friction member 38 to bias the friction member 38 away from the cover 36 and into contact with the clutch disc assembly 32. The friction member 38 is formed from aluminum in order to reduce its weight. It includes a friction surface 42, which is a very thin layer of mild steel, carbon steel or stainless steel or a combination thereof added on top of the aluminum by the PTWA thermal spray process, as described below. The friction surface 42 is coated on the friction member 38 at locations where the friction member 38 is adjacent to and faces the clutch disc assembly 32. The thickness of the friction surface 42 is shown exaggerated in FIGS. 1 and 4 for clarity in describing the invention.

The friction surfaces 34, 42 are applied to the friction members 28, 38 by first preparing the surface on which the coating will be applied. This can be done by one of several means, including, for example, grit blasting. The particular part is masked so that only the portion of the surface to which the coating will be applied is exposed, and then the part is grit blasted. The masking is removed, and the part is ready for the PTWA thermal spray process. The surfaces that were masked will remain relatively smooth and so the coating from the PTWA thermal spray process will generally not adhere to these surfaces. Thus, the coating will generally only adhere to the surfaces where a coating is desired.

Figure 4:
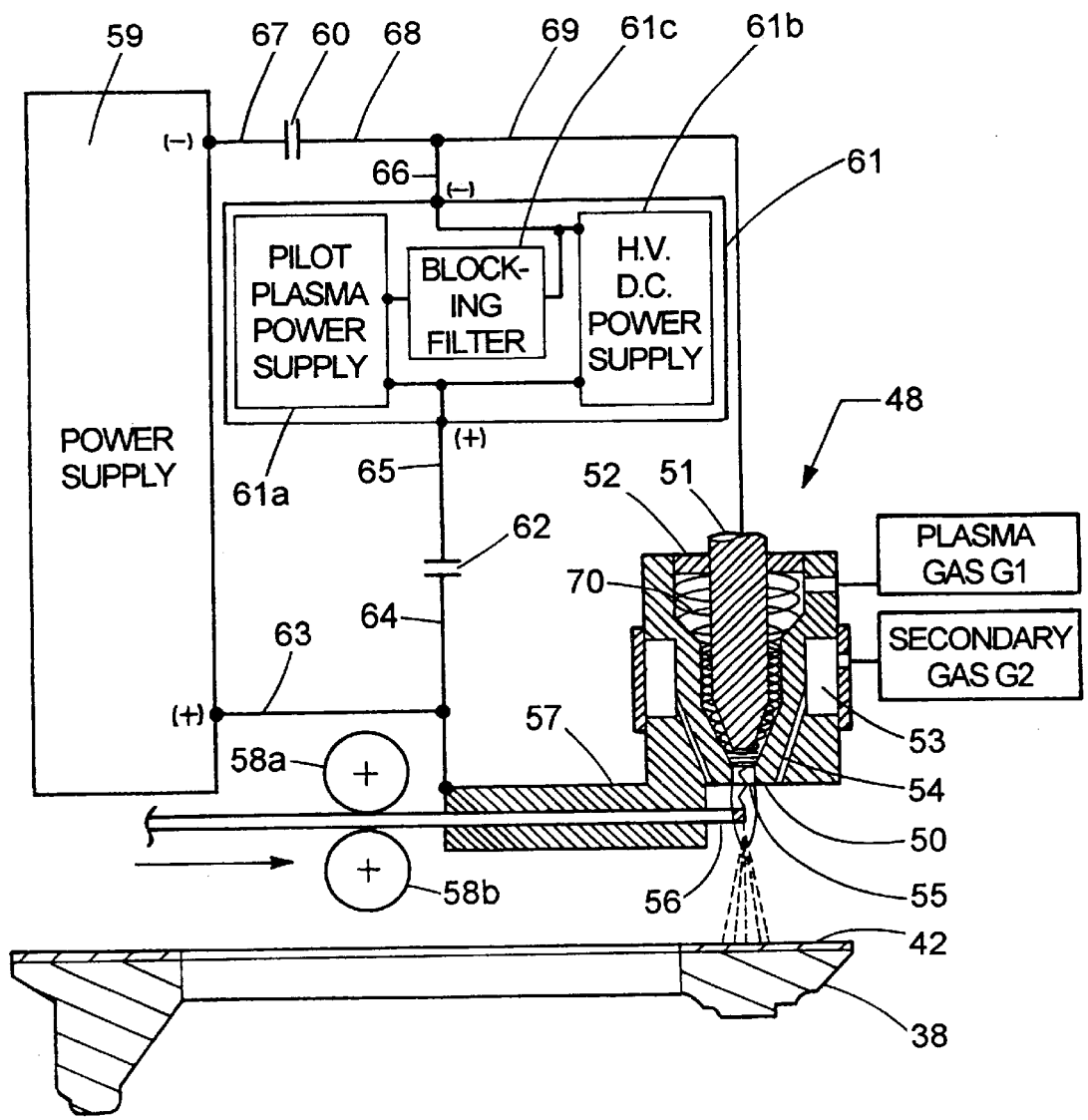
FIG. 4 is a schematic view illustrating a plasma transferred wire arc thermal spray system applying a coating to a pressure plate friction member in accordance with the present invention.

The coating is then applied to the aluminum wear surface of the flywheel or pressure plate, as the case may be, by employing a PTWA thermal spray process. The PTWA thermal spray system is illustrated in FIG. 4. A plasma-transferred-arc torch 48 is shown consisting of a constricting nozzle 50 which is in the form of a cylindrical body which may be made of a conductive material such as copper, with a constricting orifice 55 located at one end of the cylindrical body and the other end is closed off with an insulating plate 52. A cathode electrode 51, which may be constructed from 2% thoriated tungsten, is located coaxial with the constricting nozzle 50 and electrically insulated from the constricting nozzle 50 by the insulating plate 52, forming an annular plasma gas chamber internally between the cathode electrode 51 and the inner walls of the constricting nozzle 50. In addition, a separate chamber 53 is formed within the outer section of the constricting nozzle 50 which is connected to a plurality of inwardly angularly spaced bores 54 formed within the constricting nozzle 50. A wire contact tip and wire guide 57 is electrically in contact with the constricting nozzle 50, through which a wire 56 is constantly fed by means of wire feed rolls 58a and 58b. Wire feed rolls are driven by means of a conventional motor, not shown.

The electrical circuitry that is associated with the operation of the plasma-transferred-arc torch 48 consists of a pilot power supply assembly 61, the negative terminal of which is connected through electrical leads 66 and 69 to the cathode electrode 51. The pilot power supply assembly consists of a direct current (DC) constant current pilot power supply 61a and a high voltage DC power supply 61b which is in an electrically parallel connection across the pilot power supply. A high voltage DC blocking filter 61c is located in the negative leg of the high voltage power supply 61b which prevents any high voltage from feeding back into the pilot power supply 61a. The positive terminal of the pilot power supply assembly 61 is connected through lead 65 to a pilot relay contact 62 which is connected through lead 64 to the wire contact tip or feedstock free end and wire guide 57 which is in electrical contact with the constricting nozzle 50. A separate main plasma transferred wire arc power supply 59 is also employed, the positive terminal being connected by means of lead 63 to the lead 64 which in turn is connected to the wire contact tip 57, and by means of electrical contact connected to the constricting nozzle as well as the wire 56. The negative terminal of power supply 59 is connected through lead 67 to the contacts of an isolation contactor 60 through lead 68 and lead 69 to the cathode electrode 51.

In operation, plasma gas enters through port G1 into the internal chamber of the constricting nozzle, tangential to the wall of the annular inner chamber of constricting nozzle 50 in a manner to form a vortex flow 70 being forced out of the constricting orifice 55. A suitable plasma gas is a gas mixture consisting of 65% argon and 35% hydrogen. Other gases have also been used, such as nitrogen.

In order to start the operation of the plasma transferred wire arc process, it is necessary to initiate a pilot plasma. To initiate a pilot plasma, the pilot plasma power supply 61a is activated and the positive terminal is connected through the pilot relay contactor 62 to the constricting nozzle 50 and the negative terminal is connected to the cathode electrode 51. Simultaneously, the high voltage power supply 61b is pulsed on for sufficient time to strike a high voltage arc between the cathode electrode 51 and the constricting nozzle 50. The high voltage arc thus formed provides a conductive path for the DC current from the pilot plasma power supply to flow from the cathode electrode 51 to the constricting nozzle 50.

As a result of this added electrical energy, the plasma gas is intensely heated which causes the gas, which is in a vortex flow regime, to exit the constricting orifice at very high velocity, generally forming a supersonic plasma jet extending from the constricting orifice. The plasma arc thus formed is an extended plasma arc which initially extends from the cathode through the core of the vortex flowing plasma jet to the maximum extension point and then hairpins back to the face of the constricting nozzle. The high velocity plasma jet, extending beyond the maximum arc extension point provides an electrically conductive path between the cathode electrode 51 and the tip of the wire 56. As soon as the pilot plasma is established, the isolation contactor 60 is closed, adding additional power to the pilot plasma.

With the wire 56 positioned at a distance from the cathode electrode 51 such that the distance is equal to, or slightly less than, two times the length from the cathode electrode 51 to the maximum arc extension point, the extended plasma arc will transfer from the face of the constricting nozzle 50 to the tip of the wire 56 thus causing the wire tip 56 to melt as it is being continuously fed into the plasma jet. A secondary gas entering through port G2, such as air, is introduced under high pressure into chamber 53. Chamber 53 acts as a plenum to distribute this secondary gas to the series of angularly spaced nozzle ports 54. The flow of this secondary gas provides a means of cooling the constricting nozzle 50 as well as providing an essentially conically shaped flow of gas surrounding the extended plasma arc. This conically shaped flow of high velocity gas intersects with the extended plasma jet downstream of the tip of the wire 56, thus providing additional means of atomizing and accelerating the molten particles formed by the melting of the wire 56.

The atomized, molten metal contacts and deposits uniformly on the friction member 38, forming the friction surface 42 as the nozzle 50 is swept across the surface of the friction member 38. Preferably, the wire 56 is made of mild steel, carbon steel, or stainless steel or a combination thereof. The thickness of the friction surface 42 is shown exaggerated for illustrative purposes. This PTWA thermal spray process is described in more detail in U.S. Pat. No. 5,808,270, to Marantz et al., and is incorporated herein by reference.

After the thermal spray process is complete, the wear resistant surface is machined to an approximate thickness of 0.006 to 0.010 inches (0.15 to 0.25 millimeters). This thickness of the layer provides for adequate wear resistance and heat dissipation, while adding minimally to the weight of the overall assembly, which is still mostly aluminum. The components can now be assembled into a completed clutch assembly 20, as is illustrated in FIG. 1.

While certain embodiments of the present invention have been described in detail, those familiar with the art to which this invention relates will recognize various alternative designs and embodiments for practicing the invention as defined by the following claims. For example, while the preferred embodiment discussed herein has been directed to a single mass, single disc clutch, one skilled in the art will understand that it is advantageous to employ the present invention on a dual mass, single disc clutch, a single mass, multi-disc clutch, and a dual mass, multi-disc clutch.

What is claimed is:

1. A method of applying a wear resistant coating to at least one rotating component of a vehicle clutch, the method comprising the steps of:

providing a pressure plate assembly with a pressure plate friction member, with the pressure plate friction member being formed from aluminum and having a friction face thereon; and creating a friction surface on the friction face by applying a ferrous metal on the friction face with a PTWA thermal spray.

2. The method of claim 1 further including the steps of: masking the pressure plate friction member except for the friction face; and grit blasting the friction face prior to the step of creating a friction surface.

3. The method of claim 1 further including the step of machining the friction surface to a thickness of about 0.006 to 0.010 inches thickness.

4. The method of claim 1 wherein the ferrous metal is made of at least one of a mild steel, a carbon steel and a stainless steel.

5. The method of claim 1 further including the steps of:

providing a flywheel with a flywheel friction member with the flywheel friction member being formed from aluminum and having a flywheel friction face thereon; and creating a friction surface on the flywheel friction face by applying a ferrous metal on the flywheel friction face with a PTWA thermal spray.

6. The method of claim 1 wherein the step of creating a friction surface comprises the steps of:

providing a plasma transferred wire arc thermal spray apparatus having a cathode, a nozzle generally surrounding a free end of the cathode in space relation having a restricted orifice opposite the cathode free end and a wire feed directing a free end of a wire feedstock opposite the restricted nozzle orifice;

directing a plasma gas into the nozzle surrounding the cathode and exiting the restricted nozzle orifice;

initiating an electrical pilot arc between the cathode and the nozzle by creating an electrical potential differential therebetween, wherein the cathode has a negative electrical potential and the nozzle has a positive electrical potential;

extending the electric arc through the restricted nozzle orifice by increasing electrical energy to the electric arc and forming a constricted extended plasma arc; and transferring the constricted extended plasma arc from the nozzle to the free end of the wire feedstock by creating an electrical potential differential between the wire feedstock free end and the cathode, wherein the wire feedstock and the nozzle have the same positive electrical potential and the cathode has a negative electrical potential, thereby melting the wire feedstock free end, the plasma gas atomizing molten feedstock and propelling atomized molted feedstock onto the friction face and forming a dense metal coating on the pressure plate friction member.

7. The method of claim 6 further including the steps of: masking the pressure plate friction member except for the friction face; and grit blasting the friction face prior to the step of creating a friction surface.

8. The method of claim 6 further including the step of machining the friction surface to a thickness of about 0.006 to 0.010 inches thickness.

9. A clutch assembly for selectively coupling an engine crankshaft to a transmission input shaft, the clutch assembly comprising:

a flywheel assembly rotationally couplable to the engine crankshaft, with the flywheel assembly including a flywheel friction member, being formed substantially of aluminum, and including a flywheel friction face, with the flywheel friction face having a friction surface formed substantially of a ferrous metal, and with the friction surface applied to the flywheel friction member by a PTWA thermal spray process;

a pressure plate assembly rotationally fixed to the flywheel assembly, with the pressure plate assembly including a friction member, being formed substantially of aluminum, and including a friction face, with the friction face having a friction surface, formed substantially of a ferrous metal, and with the friction surface applied to the friction member by a PTWA thermal spray process; and a clutch disc mounted between the flywheel and the pressure plate, and rotationally couplable to the transmission input shaft.

10. The clutch assembly of claim 9 wherein the friction surface of the pressure plate has a thickness of approximately 0.006 to 0.010 inches, and the friction surface of the pressure plate is made of at least one of a mild steel, a carbon steel, and a stainless steel.

11. A clutch assembly for selectively coupling an engine crankshaft to a transmission input shaft, the clutch assembly comprising:

a flywheel assembly rotationally couplable to the engine crankshaft;

a pressure plate assembly rotationally fixed to the flywheel assembly, with the pressure plate assembly including a friction member, being formed substantially of aluminum, and including a friction face, with the friction face having a friction surface, formed substantially of a ferrous metal, and with the friction surface applied to the friction member by a PTWA thermal spray process; and a clutch disc mounted between the flywheel and the pressure plate, and rotationally couplable to the transmission input shaft.

12. The clutch assembly of claim 11 wherein the flywheel assembly includes a flywheel friction member, being formed substantially of aluminum, and including a flywheel friction face, with the flywheel friction face having a friction surface formed substantially of a ferrous metal, and with the friction surface applied to the flywheel friction member by a PTWA thermal spray process.

13. The clutch assembly of claim 12 wherein the friction surface of the flywheel has a thickness of approximately 0.006 to 0.010 inches.

14. The clutch assembly of claim 12 wherein the friction surface of the flywheel is made of at least one of a mild steel, a carbon steel, and a stainless steel.

15. The clutch assembly of claim 14 wherein the friction surface of the pressure plate has a thickness of about 0.006 to 0.010 inches.

16. The clutch assembly of claim 11 wherein the friction surface of the pressure plate is made of at least one of a mild steel, a carbon steel and a stainless steel.

* * * * *